United States Patent [19]

Brenner et al.

[11] 3,875,981
[45] Apr. 8, 1975

[54] MULTI-POSITION GARDEN CART

[76] Inventors: I. Edward Brenner; Everett Hugh Hunt, both of 800 W. Amerige Ave., Fullerton, Calif. 92632

[22] Filed: June 10, 1974

[21] Appl. No.: 477,677

[52] U.S. Cl. ................. 141/98; 141/231; 141/369; 248/98; 298/2
[51] Int. Cl. .............................................. B65b 1/06
[58] Field of Search ........ 280/47.26; 298/2; 141/98, 141/231, 315, 10, 114, 369; 248/98, 97

[56] References Cited
UNITED STATES PATENTS

| | | | |
|---|---|---|---|
| 603,676 | 5/1898 | Clark | 296/2 |
| 945,572 | 1/1910 | Murray | 248/97 |
| 2,084,711 | 6/1937 | Smith | 298/2 UX |
| 2,958,540 | 11/1960 | Wheeler | 280/47.26 X |

*Primary Examiner*—David Schonberg
*Assistant Examiner*—John A. Pekar
*Attorney, Agent, or Firm*—William C. Babcock

[57] ABSTRACT

A multi-position garden cart that includes a bin pivotally mounted on a wheel supported frame, with the cart when the frame and bin are in a tilted first position capable of being moved to a desired location where the frame and bin may be pivoted to a second position. The cart when in the second position is so disposed that debris may be swept into the bin, after which the frame and bin are concurrently pivoted to a first position in which both the wheels and frame are in contact with the ground surface, and in which first position a bag may be removably secured in a depending position from the cart. The bin may now be pivoted relative to the frame to a third position, where debris in the bin may be discharged therefrom to fall by gravity into the bag. The cart has members pivotally mounted thereon that may be used to temporarily support the bin in the third position while debris is discharged therefrom into the bag.

5 Claims, 6 Drawing Figures

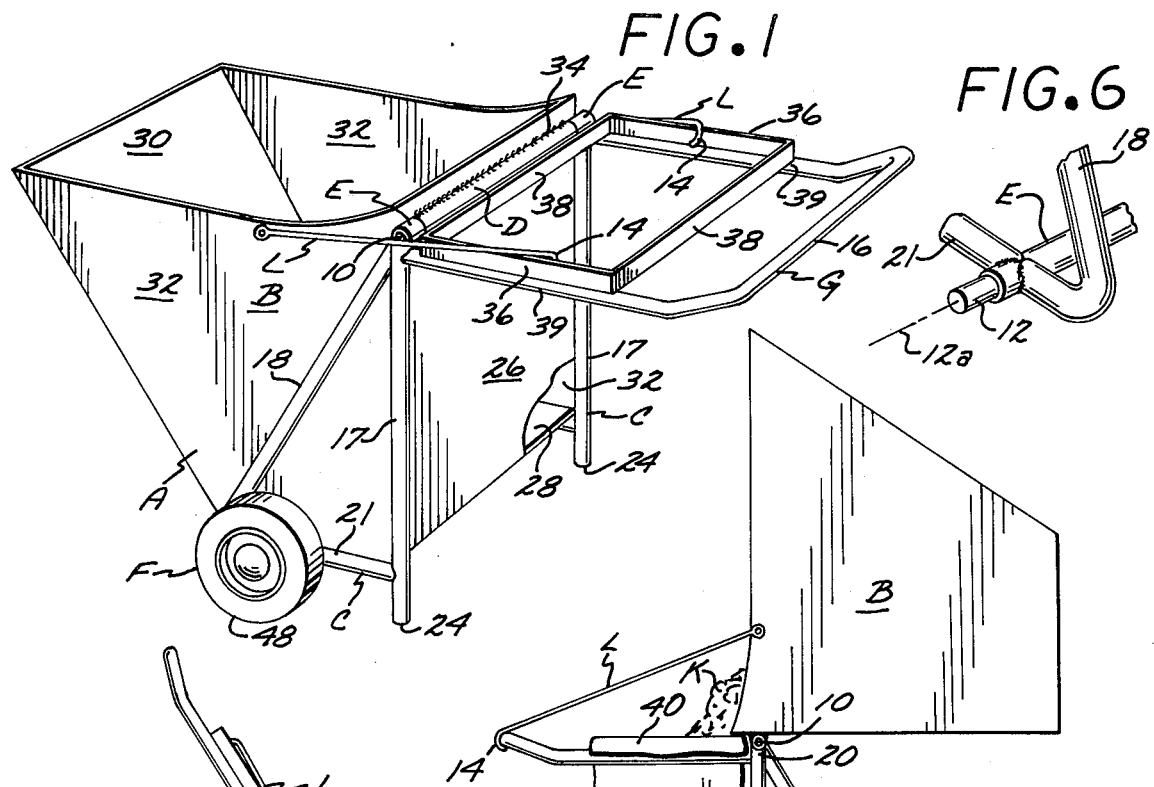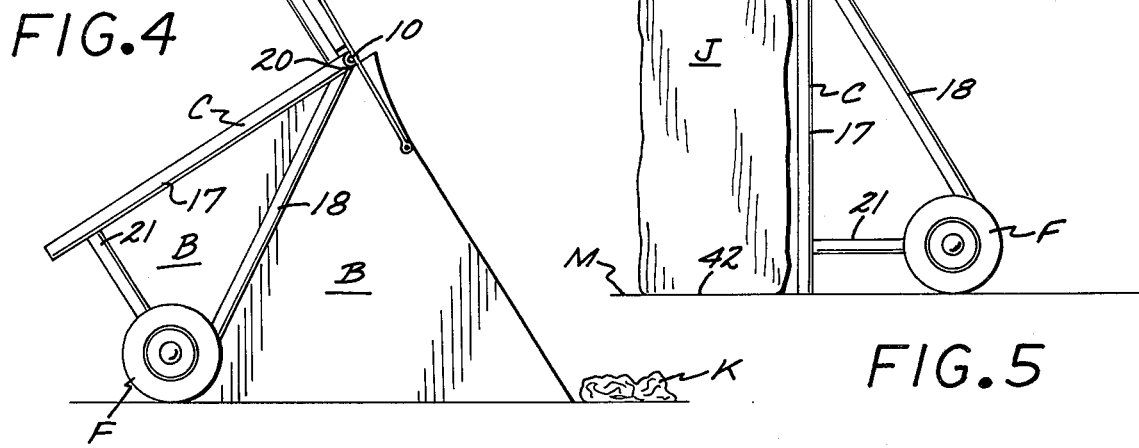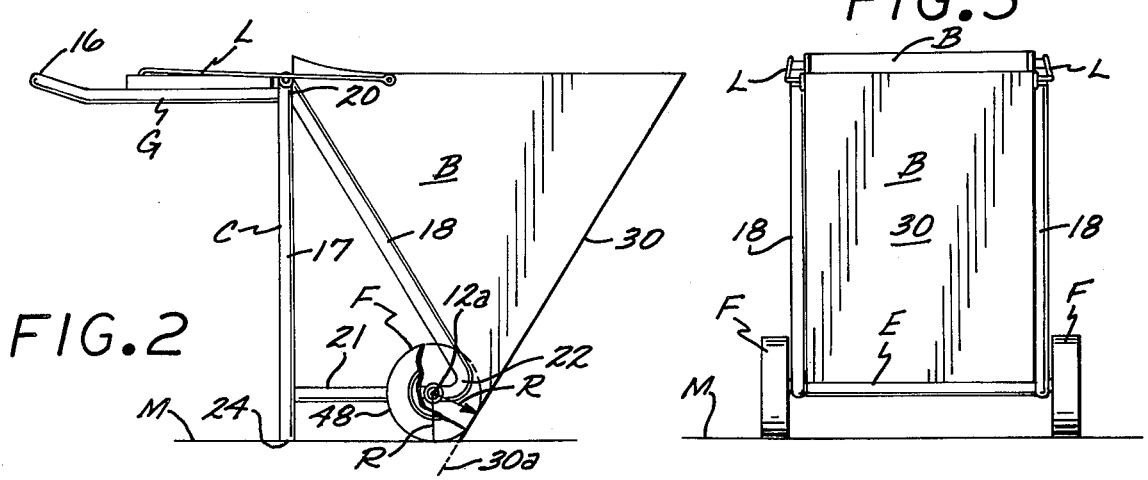

MULTI-POSITION GARDEN CART

BACKGROUND OF THE INVENTION

1. Field of the Invention

Multi-position garden cart.

2. Description of the Prior Art

In the past, various types of debris receiving garden carts have been devised and used. These carts have the operational disadvantage that leaves, cut grass, sweepings and other debris must be gathered into a pile and then lifted into the bin or basket that forms a part of the cart structure. The debris must subsequently be lifted from the cart and emptied into a bag or other container. The filled bags are then transported to a location where they will be picked up with the rubbish and like material, and subsequently hauled to a disposal area.

The primary purpose in devising the present invention is to substantially eliminate the operational disadvantage of previously available garden carts by providing a multi-position garden cart that includes a wheel supported frame on which a debris receiving bin is pivotally mounted, with the frame and bin being selectively movable to positions where debris may be swept into the bin, the bin then transported to a desired location, and the frame having means operatively associated therewith to temporarily support a bag in a depending position in which position debris collected in the bin may be swept or slid into the bag.

Another object of the invention is to provide a garden cart of simple inexpensive mechanical structure, one that is convenient and easy to use, and a cart that due to the simplicity of structure thereof requires a minimum of maintenance attention.

A still further object of the invention is to furnish a garden cart that not only serves as a means to receive and transport debris, but also serves as a means to bag the debris after the latter has been collected.

SUMMARY OF THE INVENTION

The multi-position garden cart is used in combination with a pliable bag formed from sheet plastic or a like material with the cart first being used to gather and transport debris, and the cart subsequently serving as a support for the bag to have the collected debris discharged into the latter. The cart includes a debris receiving, dimensionally stable bin that is defined by a flat bottom and first and second end walls, and a pair of side walls that extend upwardly from the bottom. Two laterally spaced, parallel, vertically disposed side frames have the bin situated therebetween. The bin has the first end wall pivotally supported by a cross member that extends between the side frames. The two side frames have a transverse shaft extending therebetween that rotatably supports a pair of laterally spaced wheels, with the shafts not only serving this function, but as a stop on which the bottom of the bin rests when the cart is in a tilted first position and is being moved to a desired location where debris is to be collected.

Movement of the cart is controlled by a U-shaped handle that extends outwardly from upper portions of the side frames in a direction away from the bin. The handle permits the cart to be disposed in a second position where the second end wall of the bin is adjacently disposed to the ground surface to permit debris to be swept into the bin, with the bin and frame thereafter being returned by a user to the first position. The handle has means operatively associated therewith to temporarily hold the bag in a depending open position therefrom, to receive debris from the bin when the latter is pivoted to a third position relative to the side frames. The cart also includes a pair of elongate members that serve to temporarily maintain the bin in a third position when debris is being discharged therefrom into the bag.

DESCRIPTION OF THE DRAWINGS

FIG. 1 is a perspective view of the garden cart in a first position in which it is adapted to hold a quantity of debris;

FIG. 2 is a side elevational view of a garden cart, with the handle having been pivoted forwardly and upwardly to the extent that the cart is supported on the ground surface by the pair of wheels only, and the cart capable of being moved to a desired location by use of the handle associated therewith;

FIG. 3 is a front elevational view of the cart in the first position;

FIG. 4 is a side elevational view of the cart in a second position where debris may be swept into the bin;

FIG. 5 is a side elevational view of the cart, with the bin being disposed in an elevated third position to permit debris to be discharged from the bin into a bag removably mounted on the cart; and FIG. 6 is a fragmentary perspective view of a portion of a side frame and wheel supporting shaft that is secured thereto.

DESCRIPTION OF THE PREFERRED EMBODIMENT

The garden cart A as may best be seen in FIG. 1 includes a bin B that is pivotally supported between two parallel laterally spaced side frames C, which frames are generally triangular in shape. The bin B has the rearward upper portion thereof rigidly secured to a first elongate member D that has end portions 10 thereof that are of circular transverse cross section. The end portions 10 are pivotally supported in transversely aligned sleeves or bearings E that are secured to the upper extremities of the frames C.

The side frames C as shown in FIGS. 2 and 6 have a transverse shaft E extending therebetween, with the shaft E having outer end portions 12 on which the wheels F are rotatably mounted as shown in FIGS. 1 to 5 inclusive. The shaft E not only serves as a rotatable support for the wheels F, but also as a stop on which the bin B rests when the garden cart A is disposed as shown in FIGS. 1 and 2. The garden cart A has a generally U-shaped handle G extending rearwardly therefrom which handle is horizontally disposed when the cart A is positioned as shown in FIG. 1. The handle G is used to manipulate the garden cart A into the various positions shown in FIGS. 2, 4 and 5.

The handle G has a hollow rigid frame H situated within the confines thereof, which frame is generally rectangular in shape, and the frame serving as a temporary support for a bag or sack J when the upper peripheral portion of the bag is doubled over to engage the frame H as shown in FIG. 5. The bag J when supported as shown in FIG. 5 may have debris discharged thereinto when the bin occupies the third position illustrated in this figure. The bin B is temporarily maintained in the third position illustrated in FIG. 5 by a pair of elongate members L that are pivotally supported from the bin B. The members L have hooks 14 on the free ends thereof that may engage a transverse portion 16 of handle G to temporarily maintain the bin B in the position shown in FIG. 5.

Each of the side frames C is preferably defined by rigid tubular members that are preferably formed from a lightweight material to minimize the overall weight of the garden cart A, which is desirable not only from a usage standpoint, but also to minimize the cost of shipping the cart. Each side frame when the cart a is disposed as shown in FIG. 1 includes a generally vertically disposed tubular member 17 which at the upper end supports one of the bearings 19. The upper end of each member 17 has a second tubular member 18 extending downwardly and forwardly therefrom, and the members 17 and 18 at the junction defining an apex portion 20 of a triangle.

The lower end of the member 18 merges into the forward end of a generally horizontal third member 21 that extends rearwardly to the first member 17 and is secured thereto by welding or the like. The third member 21 as may be seen in FIG. 1 joins the first member 17 at a position 22 that is a substantial distance above the lower ends 24 of the first members 17, which lower ends rest on the ground surface M when the garden cart A is disposed in the first position shown in FIG. 1 and when the bin B is in the third position illustrated in FIG. 5.

The bin B as may be seen in FIG. 1 includes a first end wall 26 that is substantially vertically disposed when the garden cart A is in the position shown in this figure. The first end wall 26 is secured to a substantially flat botom 28 that extends forwardly therefrom, and the forward end of the bottom being secured to a second end wall 30 that extends upwardly and forwardly. The first and second end walls 26 and 30 are connected by two generally parallel, laterally spaced side walls 32. The upper rearward portion of the first end wall 26 is secured to the elongate member D by welding 34 or other conventional means.

The shaft E joins the two side frames C to maintain the same in a desired lateral spacing that is sufficiently great that the bin B is free to pivot between the side frames. When the cart A is in a first position as shown in FIG. 1, the forward underside of the bottom 28 rests on the shaft E to prevent the bin B pivoting rearwardly relative to the side frames C. The shaft E also serves this function when the garden cart A is tilted upwardly slightly by the handle G to permit the cart to be wheeled between desired locations as shown in FIG. 2. It will be apparent that the shaft E as illustrated is merely one embodiment of a shaft structure that may be used for this purpose, and that the garden cart structure is not limited to having a tubular member E and stub shafts 12 supported therefrom as shown in FIG. 6. In other words, if desired, the shaft E can be a singular elongate rigid member that extends between the side frames C.

The frame H as may be seen in FIG. 1 is formed from a rigid rectangular strip that is bent ot otherwise formed to define two end pieces 36, and side pieces 38, which side pieces have the lower edges thereof secured to two laterally spaced parallel arms 39 that form a part of the handle G. The frame H is of such size that a commercially available plastic bag J, may be expanded within the confines of the frame, and the upper edge portions 40 of the bag doubled over to removably engage the end pieces 36 and side pieces 38 to temporarily maintain the bag in the debris receiving position illustrated in FIG. 5.

The lengths of the first tubular members 17 are such that when the cart A is disposed in the position illustrated in FIG. 5, and the bag removably depending from the frame H, that the bottom 42 of the bag will rest on the ground surface M to minimize any tendency of the bag to separate from the frame H due to the weight of the debris K deposited in the bag.

After the cart A has been moved to a desired location by being disposed in the tilted first position shown in FIG. 2, the frame C and bin B are concurrently pivoted to a second position as illustrated in FIG. 4 in which the second wall 30 is adjacently disposed to the ground surface M and debris K may be swept into the confines of the bin. After the debris K is deposited in the bin B, the cart is returned to the first position shown in FIG. 1, and the bag J then removably secured to the frame H to occupy the depending position illustrated in FIG. 5. The bin B is then pivoted upwardly in a counterclockwise direction as viewed in FIG. 5, to a third position relative to side frames C and the elongate members L then caused to engage the transverse portion 16 of the handle G.

The members L now hold the bin B temporarily in a third position relative to the side frame C, and in this third position debris K can be discharged by the user from the bin into the upper portion of the bag J, with the debris thereafter falling downwardly in the bag by gravity to fill the same. After the bag J has been filled with debris K, the bag may be removed from the garden cart A, and the bag then being free to be picked up and transported to a trash receiving dump or other disposal area.

The bin B is then returned to the position shown in FIG. 1 by disengaging the hooks 14 from the transverse portion 16 of the handle G. After such disengagement, the bin b may be returned to the position shown in FIG. 2 where the bottom 28 rests on the transverse shaft E. When the bin B is returned from the third position shown in FIG. 5 to the first position illustrated in FIG. 1, the elongate members L are caused to occupy substantially horizontal positions by disposing the hooks 14 thereof in removable engagement with the end pieces 36 of frame H as shown in FIG. 1.

Bin B may be formed from any lightweight rigid material so long as the sheet material has sufficient rigidity as to maintain the bin B in a dimensionally stable form as shown in FIG. 1, and the sheet material has sufficient strength to permit the bin B to be pivoted to the third position illustrated in FIG. 5. For ease in moving the device and the convenience in handling the same, the wheels F are provided with resilient tires 48.

For the garden cart A to occupy the second position shown in FIG. 4, the second end wall 30 must be so related to the centerline 12a of shaft E, which centerline is shown in FIG. 6, that an imaginary downward extension 30a of the second end wall as shown in FIG 2 will be tangent to the forward exterior extremities of the tires 48. In FIG. 2 it will be seen that the end wall 30 is so related to centerline 12a that the radius R of the tire will be normal to extension 30a at the tangent point and also to the ground surface M at the tangent point of tires 48 with the ground surface. The above situation will prevail when the ends 24 are in contact with the ground surface, rather than being raised slightly above the ground surface as shown in FIG. 2.

The use and operation of the invention has been explained previously in detail and need not be repeated.

We claim:

1. In combination with a pliable bag having a bottom and an elongate continuous sidewall that extends upwardly therefrom, a multi-position garden cart that may be disposed to have debris swept thereinto and then positioned to have said debris discharged from said cart into said bag when the latter is removably supported from the latter said garden cart including:
   a. a debris receiving dimensionally stable bin defined by a flat bottom, a first end wall substantially normal to said bottom, a second end wall that extends upwardly and outwardly from said bottom, and a pair of laterally spaced, substantially parallel sidewalls that extend between said first and second end walls and are connected to said bottom;
   b. two laterally spaced, parallel, vertically disposed frames adjacently disposed to the exterior surfaces of said sidewalls;
   c. first means for pivotally supporting said bin from said frames;
   d. a pair of parallel laterally spaced wheels;
   e. a transverse shaft secured to said frame, said shaft having said wheels rotatably mounted thereon, and said shaft having the portion of said bottom most adjacent said second end wall resting thereon when said frames and bin are in a first position to limit the pivotal movement of said bin to a position beyond that at which said bottom is horizontally disposed;
   f. a U-shaped rigid handle secured to upwardly disposed portions of said frames for concurrently pivoting said bin and said frames to a second position where said second end wall is adjacently disposed to the surface on which said wheels rest and said debris can be swept into said bin, and said handle being usable to concurrently pivot said bin and frames from said second to said first position after said bin has had said debris disposed therein;
   g. second means for removably supporting said bag in a depending position within said handle when said frame is in said first position to permit said bin to be pivoted to a third position above said frame where said debris can be swept from said bin into said bag; and
   h. third means for temporarily maintaining said bin in said third position during the time said debris is being moved from said bin to fall by gravity into said bag.

2. A garden cart as defined in claim 1 in which each of said frames is, triangular in shape and is defined by first, second and third rigid elongate members that are secured to one another, said first member being substantially vertical when said garden cart is in said first position, said second member extending downwardly and forwardly from said first member when said garden cart is in said first position, and said third member extending rearwardly from a lower portion of said second member to said first member, with said first and second members at their upper extremities cooperating to define an apex, and said first means including:
   i. two transversely aligned bearing supported on said apexes;
   j. a transverse rigid member pivotally supported in said bearings, with said transverse rigid member secured to a portion of said first end walls that defines an upper portion thereof when said garden cart is in said first position.

3. A garden cart as defined in claim 2 in which said shaft is so positioned and supported from said frames, and the radius of said wheels is so related to the position of said second end wall and the angle on which said second end wall extends upwardly and outwardly from said bottom, that said second end wall is adjacently disposed to the surface on which said wheels rest when said garden cart is in said second position.

4. A garden cart as defined in claim 1 in which said means is a rectangular frame secured to said handle and disposed substantially within the confines thereof, and said rectangular frame removably supporting said bag, when the circumferential free end portion of said bag is doubled over said rectangular frame.

5. A garden cart as defined in claim 1 in which said third means are a pair of laterally spaced members pivotally supported from said sidewalls, said laterally spaced members including hooks that removably engage said handle when said bin is in said third position.

* * * * *